July 8, 1930.　　　G. C. THOMAS, JR　　　1,770,116
CABLE CONNECTER
Filed June 1, 1927
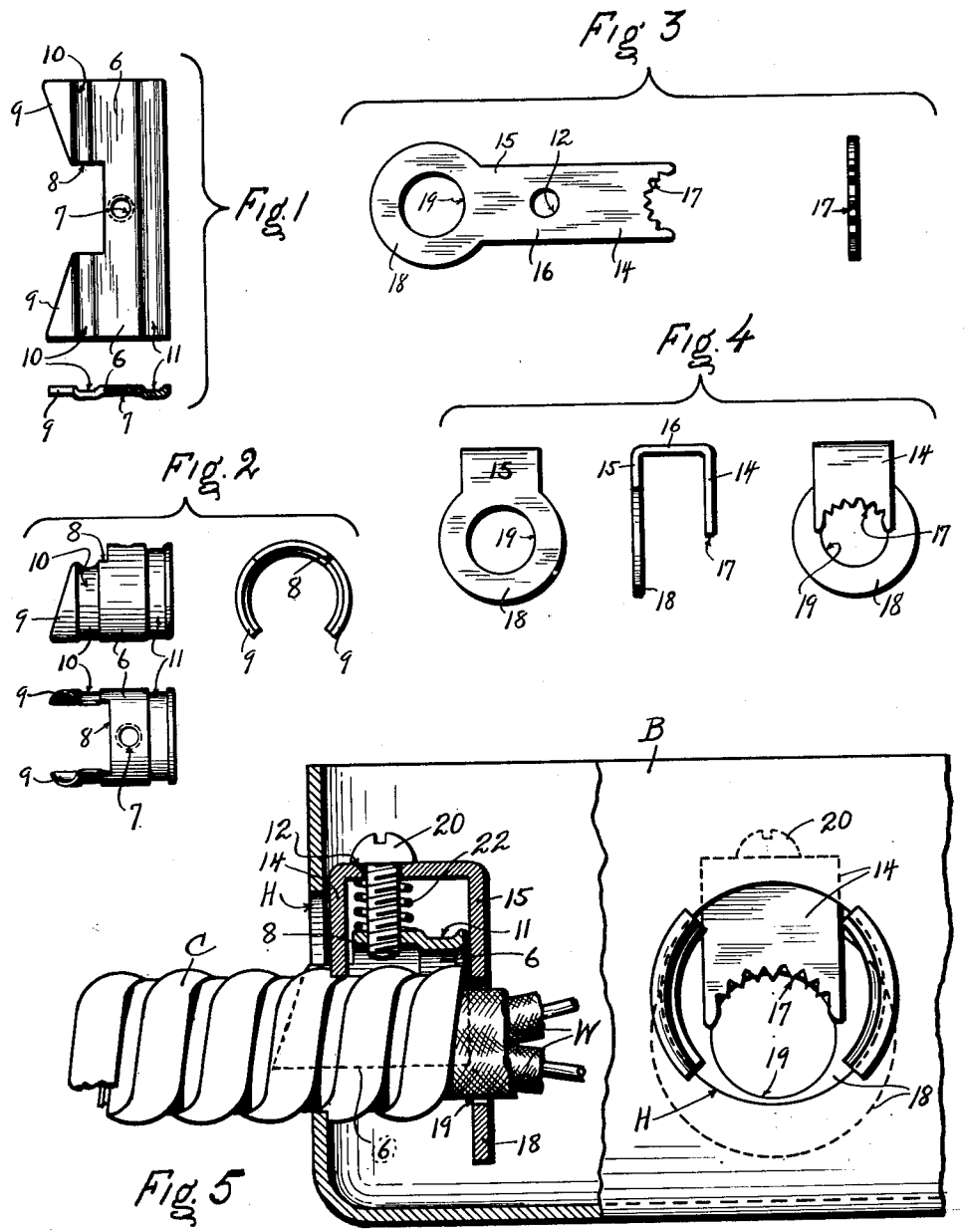
INVENTOR
George C. Thomas, Jr.
BY
Bohleber + Ledbetter
ATTORNEYS Patented July 8, 1930

1,770,116

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed June 1, 1927. Serial No. 195,662.

This invention relates to cable and box connecting means and particularly to cable connecters to fasten cable to electric fixture and outlet boxes.

A purpose of the invention is to produce a novel connecter, the sleeve member of which may be made of relatively heavy gage stock, but which includes novel means to aid overcoming the sleeve resistance by which said sleeve is easily contracted and forced into a box hole and its anchorage means made to snap into place within the box hole and against the box wall.

Among other things, an object is to produce a cable connecter of the exposed box hole edge type and more particularly improved in respect to the construction and operation of a single cable clamp and operating means by which the connecter anchors itself in a box hole and simultaneously fixes a cable therein.

A further object is to produce a connecter wherein the cable clamp includes jaw means together with a cable bushing stop. The jaw grips a cable and the bushing acts as a stop against which rests the sharp ragged end of the cable where the latter is armored and through which the wires pass from the cable through the connecter into the box.

A still further object is to improve the connecter member, that is the body or base part on which the cable clamp, the bushing, and the operating means are carried. To this end, I make the connecter member in a novel way by which a portion of the box hole edge is uncovered and directly exposed to a cable, the connecter member including a guide way notch inside the box in which a slide jaw reciprocates to grip a cable, and operating means is carried with the connecter inside the box to apply pressure to the slide jaw.

The accompanying drawings illustrates an example of the connecter serving to disclose its principles, construction and mode of use wherein:

Figure 1 shows two views of a flat sheet metal blank from which the connecter body member is fashioned, there being shown a plan view and a cross section thereof.

Figure 2 shows three views of the connecter member on which the accessory parts are to be mounted to complete the connecter, there being respectively a side, top and outer end view.

Figure 3 shows a flat sheet metal stamping comprising a plan and jaw end view of a blank before it is bent into final form and from which a combination cable clamp jaw and bushing ring is fashioned.

Figure 4 shows the complete combination cable clamp jaw and bushing device, there being a bushing end elevation, a side view, and jaw end elevation.

Figure 5 is a box assembly view with two connecters mounted therein. The left side of the box shows a cable and connecter in finally anchored position. The right side of the box shows an outer end elevation of the connecter mounted in the box hole but with the cable omitted.

Electric fixture or outlet boxes B are ordinarily made with knock out openings or holes H to receive the cable C and a connecter 6 to fasten the cable in the box, and to pass the wires W into the box in the usual way, and thus make electric connection inside the box with other circuit wires leading thereto.

Referring further to the drawing and describing first the structure of an example of the connecter body member as shown in Figures 1 and 2, there is illustrated a member 6 preferably fashioned or rolled into sleeve shape from a sheet metal blank provided with a tapped screw hole 7 made adjacent a notch or clamp guide way 8. The ends of the blank 6 taper outwardly, gradually increasing in width from the notch 8 to form wing-like points 9 which are comparatively flexible in relation to each other after the blank is rolled into sleeve form.

The points 9 carried on the outer end of the connecter sleeve member 6, together with a box hole edge engaging groove 10, provides an extension on the sleeve by which the member 6 is readily snapped into the box hole and anchored therein by the groove 10. By slightly tipping the connecter sleeve out of its normal position and at an angle to the box hole axis, the flexible extension or wing-like points 9 are first engaged with the box hole edge and thereafter yieldingly admit the sleeve 6 to be thrust into the box until the anchorage groove 10 snaps into engagement with the thin edge of the box wall defining its knock out opening H. The connecter is thus quickly inserted by pressing it longitudinally and straightening it up until the sleeve axis is parallel with the box hole axis whereupon the groove or other suitable anchorage means 10 positively anchors the sleeve in the box with the guide way notch H preferably disposed on the inside of the box. In this way the flexible extension wing points 9 aid in the insertion of the member in the box hole since they afford a sleeve end of somewhat reduced stock and size by which to gain initial entry by flexure of the sleeve points 9.

The unique formation of the sleeve as above described performs several useful functions. The sleeve as shown is preferably cylindrical in form but it is mutilated or cut away opposite the screw hole 7 and notch 8 by which its free ends fail to meet and thereby may define a gap or opening for the full length of the connecter. In this way the sleeve is weakened to make for its flexibility during its insertion within a box hole for it is now understood how the wing entry points 9 may be readily inserted into the box hole by an initially wedging action executed by first tipping the connecter sleeve to start its wings sliding into the box hole. By making the sleeve in this way, relatively heavy stock may be used and the member may be rolled into form with a maximum sleeve diameter without at the same time being too stiff or rigid for insertion. This unique sleeve formation provides weakening means in conjunction with wedging means in the wings 9 so that a spring sleeve of great resistance may be easily snapped into place in a box hoe.

The form of the sleeve member just described also provides a connecter member whose body and shape includes means which exposes a portion of a box hole edge directly to the cable. The lengthwise gap or opening is effected at the box wall to leave uncovered the edge of the box hole. Thus the cable C rests thereon when inserted into the box hole, and the box hole edge is utilized an one jaw, a stationary jaw, against which the cable is squeezed when gripped by a movable jaw to be described. The inenr end of the sleeve 6 may also be provided if desired with a groove 11 which imparts symmetry to the connecter member and aids in guiding the blank through the rolling machine in the process of forming up the connecter member.

Reference is now had to Figures 3 and 4 wherein is shown an improved cable jaw clamp and bushing ring. The cable clamp appears in general inverted U-shape form from the side and comprises parallel leg portions 14 and 15 carried on a base 16 forming the bottom loop of the inverted U-shaped member. A cable clamp jaw 17 is formed on the lower end of the leg 14 which is adapted as a slide to reciprocate in the notched guide way 8, while the leg part 15 carries a bushing ring 18 in which it formed an aperture 19 through which the wires W pass from the cable connecter into the box. A screw hole 12 is formed in the base portion 16 and is adapted to receive a screw operating means 20 passed freely therethrough. The cable gripping jaw 17 is made in any suitable form and may be serrated or toothed as shown to better grip the cable and is movable transversely within the sleeve 6, while the bushing 18 is similarly movable at the end of the sleeve.

By reference to the general assembly view of Figure 5, the manner of completing the connecter is apparent. The combination clamp jaw and bushing ring 16 is slidably mounted on the connecter body 6 with the bushing ring 18 disposed over the inner end of the sleeve 6 and with the slide jaw 14 movably mounted within the guide way notch 8 at or proximate one end of the sleeve which disposes the cable gripping jaw 17 within the connecter sleeve 6 and directed at the right angles towards the cable C, and with the sleeve wings 9 extending beyond the box wall on the outside thereof.

A coil lifting spring 22 is confined on the screw 20 under pressure between the member 16 and the connecter body 6, the result of which is to normally urge the cable gripping jaw 17 away from the cable C. In this way, the spring 22 holds the slide jaw 14 and the bushing ring 18 in an upwardly limited position, retaining them as high on the connecter member as admitted by the head of the screw 20, i. e. the spring urges both the cable jaw and the bushing laterally outward from the box hole so as to enable the mechanic to easily insert the cable.

Inasmuch as the guide way notch 8 for the reception of the slide jaw 14 is cut through the box hole edge anchorage means 10 and extends towards the inner or grooved sleeve end 11, it follows that the useful portion of the guide way of the notch 8 is placed within the box and closely adjacent the box wall. This construction places the slide jaw proximate the box wall and substantially parallel thereto so that as the jaw 17 grips against the cable C, the pressure is applied substantially close to the plane of the box wall, thereby causing the jaw 17 to grip the cable C between it and the exposed box hole edge H.

Inasmuch as the pressure applied on the cable by the gripping jaw 17 is slightly offset from the plane of the box wall, it follows that the inner end of the cable might tend to be bent downwardly by the jaw pressure, but this is avoided by the cable support bushing ring 18 because the inner end of the cable is supported in the aperture 19 of the bushing. The short end of the cable is therefore supported or braced by resting in the bushing 18. Furthermore the bushing ring 18 spreads across the inner end of the connecter sleeve 6 thereby forming a well-closed connecter sleeve out from which the wires W pass into the box.

The U-shaped device 16 therefore includes the slide jaw 14 and parallel bushing ring 18 with the connecter body member 6 disposed therebetween, the spring 22 normally holding the jaw out of line with and away from the cable and similarly holding the bushing in position conforming to that of the jaw 17. Also the spring properties of the sleeve 6 causes it to snap into the box hole and retain itself in position during the insertion of the cable. The fingers of the mechanic are therefore free for other work since he does not have to adjust the jaw or hold the sleeve in place.

I may also prefer to place the screw or other suitable operating means 20 proximate the slide jaw 14 since the force or pressure is transmitted through the latter to the cable and in this way is avoided unnecessary side strain on the jaw and it is made to perform its function in a most effective way.

The cable clampng means as a whole comprising the jaw, screw and spring are preferably disposed inside the box so the connecter is well adapted for both old and new housework. Since the movable jaw grips and clamps the cable close to the stationary exposed box hole edge, the cable is not permitted to creep or slip out of the box hole after the screw is tightened up, for, although the jaws $H^{17}$ may secure a hold on the cable near its end, especially so if the latter is not inserted all the way into the bushing, the cable is nevertheless positively anchored in the box hole because the straight downward pressure of the jaw gripping the cable substantially at right angles to the cable axis, avoids all chance of backing the cable out of the box hole. By virtue of the design, construction and arrangement of parts as shown, I am able to place the clamping means inside the box without displacing or loosening the grip of the exposed box hole edge on the cable.

The connecter is positive in operation and use and works entirely by a single operating means to anchor the connecter and a cable in a box hole without any screw connection whatsoever with the box and without the screw engaging the cable.

What I claim is:—

1. A connecter comprising, a member adapted to be received into a box hole, including box hole edge anchorage means carried therewith, a bushing plate mounted movably at right angles to the axis of the member and at the end of the member, a cable clamp, means extending outside the member to connect the bushing plate and cable clamp together in operative relation, and operating means carried on the connecter to move the cable clamp relatively to the member into operative position applying pressure thereto and simultaneously adjusting the bushing plate in conformity with the position of the cable clamp.

2. A connecter as defined in claim 1 wherein spring means cooperates with the bushing plate and the cable clamp to normally release the cable.

3. A connecter comprising, a member adapted to be received into a box hole, including box hole edge anchorage means carried therewith, a bushing plate mounted movably substantially at right angles to the member at one end of the member, a cable clamp mounted movably substantially at right angles to the member at the other end of the member, means extending outside the connecter member to connect the bushing plate and cable clamp together in operative relation, and operating means carried on the connecter to move the cable clamp relatively to the member into operative position applying pressure thereto and simultaneously adjusting the bushing plate in conformity with the position of the cable clamp.

4. A connecter comprising a connecter sleeve adapted to be received into a box hole and including means formed to expose a box hole edge to a cable and including box hole edge anchorage means, a bushing plate mounted movably substantially at right angles to the sleeve and at the end of the sleeve, a cable clamp also mounted movably substantially at right angles to the sleeve and at the other end of the sleeve, means extending outside the connecter member to connect the bushing plate and cable clamp together in operative relation; and operating means carried on the connecter to move the cable clamp into operative position applying pressure thereto and simultaneously adjusting the bushing plate in conformity with the position of the cable clamp, and a spring confined between the means outside the connecter and the sleeve to normally release the cable.

5. A connecter comprising; a sleeve adapted to be received into a box hole, provided with a guide way notch, and with an opening opposite the notch to expose a box hole edge, and including box hole edge anchorage means; a bushing plate mounted movably at right angles to the axis of the sleeve at the end of the member, a cable clamp movably confined in the guide way notch and connected externally of the sleeve with the bushing plate, means normally holding the member apart from the bushing plate and cable clamp, and operating means carried on the connecter to move the cable clamp into operative position applying pressure thereto and simultaneously adjusting the bushing plate in conformity with the position of the cable clamp.

6. A connector comprising, a member adapted to be received into a box hole, a U-shaped device including a cable gripping jaw and a bushing ring, the member aforesaid being mounted within the U-shaped device between the jaw and bushing ring, a spring disposed between the member and U-shaped device to normally urge them apart, and a screw mounted freely through the device threaded into the member and passed through the spring to hold all parts together and uniformly adjust the jaw and bushing ring.

7. A connecter comprising; a yielding sleeve provided with a guide way notch at one end, portions extending from the notch, box hole anchorage means in the extending portions by which the guide way notch is disposed inside a box, said extension means including wing points tapering from the notch to enable the resistance of the yielding sleeve to be overcome by wedging the wing points into the box hole, a slide including a cable gripping jaw mounted within the guide way notch, and operating means carried with the sleeve portion which is inside the box to actuate the slide and jaw.

8. A connecter comprising; a sleeve formed to expose a box hole edge, made of flexible material to spring into the box hole, an anchorage groove formed in the sleeve, and tapering flexible sleeve end portions extending lengthwise of the sleeve from the groove enabling the sleeve to be tipped at an angle to the normal sleeve axis for initial entry thereof into the box hole, whereby the groove is snapped into engagement within the box hole by sliding the tapering sleeve end portions against the box hole edge, and screw and cable clamp means to expand and seat the sleeve in the box hole and grip a cable against the exposed box hole edge.

9. A connecter comprising; a sleeve provided with a box hole anchorage groove, a guide way, and wedging box hole entry wings extending from the groove; an inverted U-shaped device embracing the sleeve ends including, a slide jaw mounted in the guide way, and a bushing ring over the outer sleeve end; a screw threaded through the sleeve close to the guide way and close to the slide jaw and passed freely through the U-shaped device to impose pressure on the slide jaw; and a spring to urge the U-shaped device away from the sleeve.

In testimony whereof I affix my signature.

GEORGE C. THOMAS, Jr.